July 19, 1960     T. J. HARPER     2,945,256
FISH AND GAME HOLDING CLAMP
Filed May 19, 1958
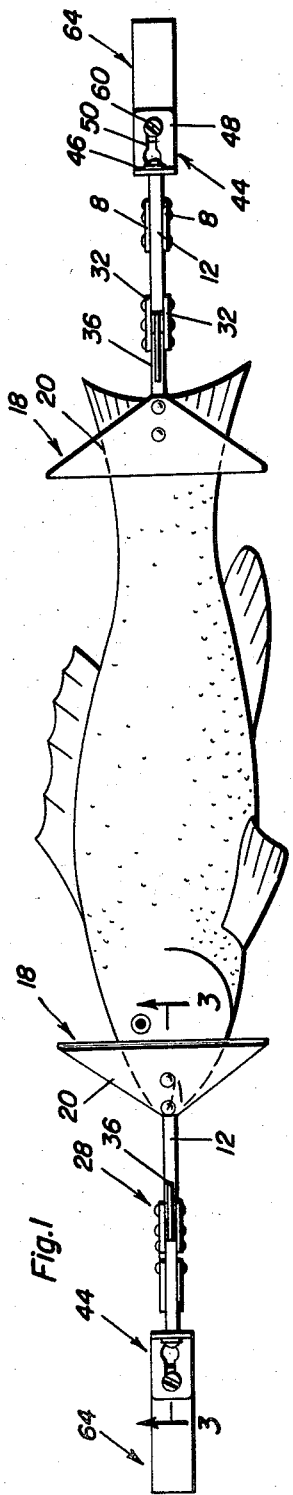
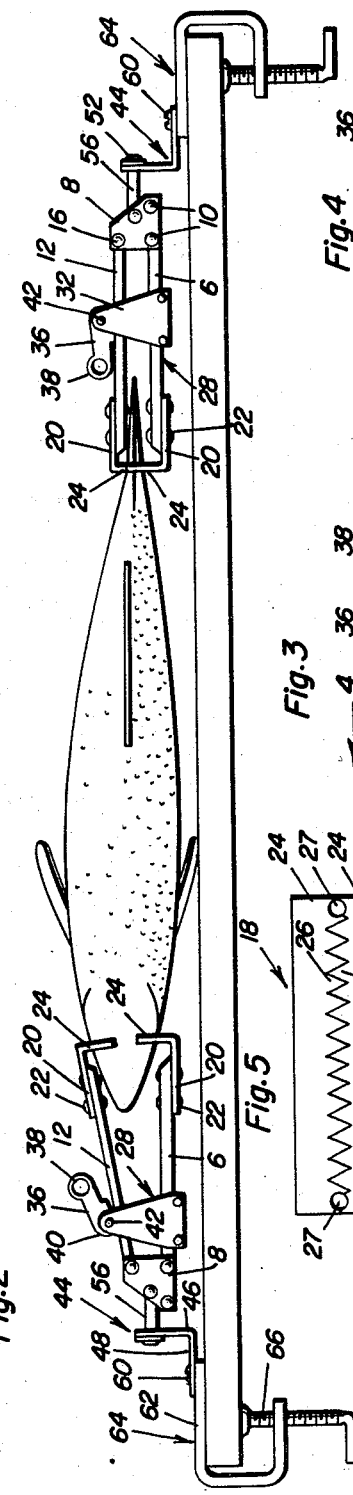
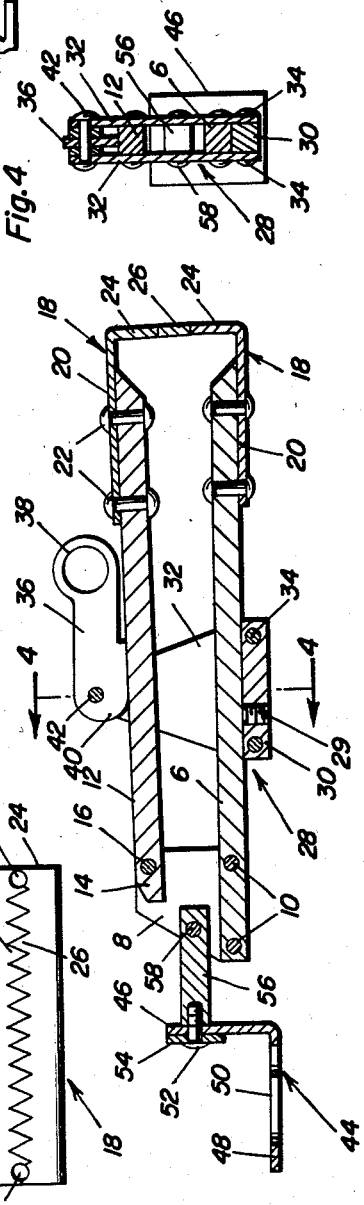
Ted J. Harper
INVENTOR.

United States Patent Office 2,945,256
Patented July 19, 1960

2,945,256

FISH AND GAME HOLDING CLAMP

Ted J. Harper, Box 51, Henning, Minn.

Filed May 19, 1958, Ser. No. 736,322

4 Claims. (Cl. 17—8)

This invention relates to a simple, practical and feasible clamp which is expressly, although not necessarily, adapted to clampingly hold game birds and fish to facilitate cleaning, scaling and such other operational steps as are required to prepare the same for eating.

An object of the invention is to structurally, functionally and otherwise improve upon similarly constructed and performing clamps and to provide a construction in which manufacturers will find their manufacturing requirements and economies met and fishermen, hunters and the like will have at their disposal expedient and practical clamping means which in addition to serving when handling fish is also made to take care of the cleaning of both fowl and fur-bearing animals, such as a successful hunter desires to dress out.

Other objects, features and advantages will become more readily apparent from the following description and the accompanying drawing.

In the drawing, wherein like numerals are employed to designate like parts throughout, the views:

Fig. 1 is a top plan view showing two clamps, how they are constructed and how they are used in paired relationship for fish scaling and cleaning requirements.

Fig. 2 is an elevational view of the construction seen in Fig. 1.

Fig. 3 is an enlarged view in section and elevation taken on the plane of the line 3—3 of Fig. 1, looking in the direction of the arrows.

Fig. 4 is a transverse vertical section taken on the plane of the line 4—4 of Fig. 3.

Fig. 5 is a front end view of the jaws showing the same closed and which in effect is a view looking, let us say, at the right-hand end of Fig. 3 in a direction from right to left Briefly summarized the invention in a preferred embodiment thereof is characterized by a practical mechanical clamp embodying an elongated lower arm, a companion upper arm opposed in spaced relation to said lower arm, means operatively connecting the respective inward ends of said arms to each other, one arm being fixed to said means and the other arm pivotally connected to said means, cooperating jaws fixed on the outward ends of said arms, a U-shaped stirrup-like slide embracing and slidingly mounted on median portions of said arms, a lever pivotally mounted on and carried by said slide and having a pressure applying and clamping cam operatively cooperating with a median portion of said upper arm, and means for swively and removably anchoring the first named means on a stationary support.

The means which is employed for operatively joining or assembling the two arms is characterized by simple plates which together define a sheath. The sheath, constructed as shown, is desirable in that it facilitates locating an end portion of a connecting member therebetween and pivoting it in place, said member providing a satisfactory connection between the sheath and an anchoring clip with which the member has separable and swivel connection. This construction makes it possible to turn the clamp over for effectual fish scaling requirements.

Referring now to the drawings it will be seen that the clamps are the same in construction and the description of one will suffice for both. With reference to Fig. 3 the aforementioned lower elongated arm is denoted by the numeral 6 and it comprises a rigid metal or equivalent bar. The left hand end portion of this bar is located between a pair of spaced parallel suitably shaped plates 8 and is fixedly secured to the lower portions of the plates by rivets or equivalent fasteners 10. The opposed generally parallel upper companion or complemental arm is also a bar member and it is denoted by the numeral 12 and the corresponding end 14 thereof is pivotally connected between the upper portions of the plates as at 16. The plates 8 thus define a simple sheath. The jaws are the same in construction and are mounted on the outer ends of the respective arms and each jaw is denoted by the numeral 18. Each jaw preferably comprises a stainless steel or equivalent non-corrodible generally triangular plate 20 which is fixedly riveted to its particular arm as at 22. The depending or lateral flange on the outer end of the plate is denoted at 24 and the free edge thereof is serrated or otherwise constructed to provide clamping teeth 26. The sets of the teeth on the respective jaws cooperate properly to securely grip either the head or tail of the fish in the manner illustrated in the drawings. With reference now to Fig. 5 it will be noticed that the respective end portions of the toothed blades are provided with opposed semi-circular notches which come together in providing generally circular holes 27. The obvious purpose of the holes is to provide suitable grips and to accommodate the legs of a game bird while the same is being held for the purpose of skinning or plucking as the case may be.

The stirrup-like slide is denoted at 28 and comprises a rigid base plate 30 which has firm sliding and guiding contact with a cooperating flat surface of the lower arm 6. The lateral arm portions 32 are riveted or otherwise secured at 34 to the base plate and they straddle the two arms with the upper narrowing ends projecting above the median portion of the upper arm 12. These end portions serve to carry the simple manually operable lever 36. The lever is provided at one end with a finger ring 38 and at the opposite end with a cam 40 pivoted in operative position at 42. The cam is shaped so that it has pressure and binding cooperation with the median adjacent surface of the upper arm 12. Obviously by sliding the stirrup 28 back and forth the leverage and clamping action is increased or decreased and the jaws are allowed to open and close to accommodate the varying needs of the user. With reference now to Fig. 3 it will be noted that the aforementioned plate 30 is provided between the center and one transverse end with a setscrew 29 threaded through a hole provided therefor and wherein, under this arrangement, the setscrew is engageable with a cooperating surface of the arm 6. This thus offset setscrew 29 may be utilized whenever necessary or desired to take up slack in case of wear.

With reference now to the aforementioned L-clip this is denoted as an entity by the numeral 44 and it comprises a vertical limb 46 and a horizontal limb 48. The limb 48 is provided with a key-hole shaped slot 50. The other vertical arm 46 has an aperture therein providing a bearing for the journal portion of a connecting screw 52 provided with a suitable washer 54 and having its screw threaded end screwed into a socket in one end portion of the connecting member 56. This connecting member has its forward end projecting between the plates 8 where it is pivotally connected with the plate as at 58. Thus the member 56 serves to provide the desired pivotal and swivelling connection between the clamp, as a first unit, and the L-clip as a second unit. This L-clip may be fastened on a nail or the like (not shown) on a stationary support such as a board, shelf, bench or the like. In other instances key-hole slot may be connected with a headed screw or the like 60 carried by the upper arm 62 of a common C-clamp 64. This is the type of clamp having a setscrew 66 and the clamp is, of course, secured over the end portion of a cleaning board or the like in the manner shown.

In practice in order to tighten the jaws the stirrup and cam lever is slid toward the jaws. The two arms 6 and 12 are of course not strictly parallel and therefore a greater pull on the jaws is attainable. The principal part may be made of quality steel or a special stainless steel that lends itself to coating by painting or otherwise.

It is repeated that the teeth 26 preferably are V-shaped and are analogous to saw teeth for effectually catching hold of portions of the fish being held in the manner seen in Figs. 1 and 2. With respect to the notched end portions outwardly of the teeth 26 these provide the aforementioned holes 27 which serve to hold not only the legs of a game bird but also legs of small animals which may be clamped while being cleaned. The setscrew 29 is adjusted to an out-of-the-way position until the surfaces of cooperating parts wear unduly. Then it may be utilized to adjust the parts and compensate for wear.

Th foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in holding fish, game birds and the like while scaling, cleaning and otherwise preparing the same for use comprising an elongated lower arm, a companion upper arm opposed in spaced relation to said lower arm, spaced plates operatively connecting like inward ends of said arms to each other, one arm being fixed to said plates, the other arm pivotally connected to said plates, cooperating jaws fixed on like outward ends of said arms, a U-shaped stirrup-like slide embracing and slidingly mounted on median portions of said arms, a lever pivotally mounted on and carried by said slide and having a pressure applying and clamping cam operatively cooperating with a median portion of said upper arm, and means for swivelly and removably anchoring the plates on a stationary support, said means comprising an L-clip and a connecting member having one end pivoted between said plates and the other end separably and swivelly connected with one limb of said L-clip, the other limb of said L-clip having a keyhole-shaped slot therein.

2. The structure defined in claim 1, and wherein said jaws each comprise a triangular plate having a lateral flange with a serrated edge providing teeth.

3. In combination, an L-clip having horizontal and vertical limbs, the horizontal limb being provided with a keyhole-shaped slot adapted to be separably connected with a fastener provided therefor on an arm of a C-clamp, a connecting member at right angles to and swivelly and detachably carried by the vertical limb, a jaw-equipped clamp having a sheath at one end, said sheath being provided with spaced complemental plates, said connecting member being pivotally mounted between said plates, said clamp comprising an elongated lower arm, a companion upper arm opposed in spaced relation to said lower arm, said plates operatively connecting the respective inward ends of said arms to each other, one arm being fixed between the plates and the other arm pivotally suspended between said plates, cooperating jaws fixed on the outward ends of said arms, a U-shaped stirrup-like slide embracing and slidingly mounted on median portions of said arms, and a lever pivotally mounted on and carried by said slide and having a pressure applying and clamping cam operatively cooperating with a median portion of said upper arm.

4. A portable holding and clamping device comprising a clamp embodying a pair of opposed spaced parallel plates, a first elongated rigid bar constituting a lower arm and having one end portion interposed between portions of said plates and rigidly secured to the plates, spacing the plates apart, said plates and the portion of the bar interposed therebetween cooperating and defining a sheath, a second rigid elongated bar providing an upper arm and opposed in spaced relation to the lower arm, one end of said upper arm being located and hingedly mounted between upper portions of said plates, the ends of said arms remote from said sheath being provided with complemental clamping jaws, a stirrup-like slide comprising a rigid base plate having firm sliding and guiding contact with a cooperating surface of said lower arm, lateral arm portions secured to said base plate and extending laterally therefrom and straddling cooperating lengthwise edge portions of said upper and lower arms and extending at upper ends to a position above the top of the upper arm, a lever having a finger grip at one end and a friction locking cam at the other end, said cam-equipped end being pivoted between upper ends of the arms of said slide, said slide and lever being bodily shiftable in relation to said upper and lower arms, a clip adapted to be anchored on a relatively stationary support, and a connecting member providing an operating connection between said clip and the plates of said sheath.

References Cited in the file of this patent
UNITED STATES PATENTS

| | | |
|---|---|---|
| 1,259,109 | Kugler et al. | Mar. 12, 1918 |
| 2,300,321 | Swezey | Oct. 27, 1942 |
| 2,435,075 | Gould | Jan. 27, 1948 |
| 2,511,592 | Krafczyk | June 13, 1950 |
| 2,686,334 | Miller | Aug. 17, 1954 |